(12) United States Patent
Hoffman et al.

(10) Patent No.: US 11,167,423 B1
(45) Date of Patent: Nov. 9, 2021

(54) END OF ARM TOOL CAPABLE OF EJECTING TOTES

(71) Applicant: Amazon Technologies, Inc., Seattle, WA (US)

(72) Inventors: Maxim Hoffman, Bothell, WA (US); Roland Menassa, Renton, WA (US); Lane Sturman, Holland, MI (US); Lance Hartman, Holland, MI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/278,492

(22) Filed: Feb. 18, 2019

(51) Int. Cl.
*B25J 15/00* (2006.01)

(52) U.S. Cl.
CPC ................ *B25J 15/0028* (2013.01)

(58) Field of Classification Search
CPC ...... B25J 15/0028; B65G 59/00; B65G 59/06; B65G 59/061; B65G 59/063
USPC ........ 414/795.6, 222.04–222.12; 901/30, 31, 901/41
See application file for complete search history.

(56) References Cited

U.S. PATENT DOCUMENTS

| | | | | |
|---|---|---|---|---|
| 1,126,194 A * | 1/1915 | Graham | ........... | B01L 9/543 414/798 |
| 3,135,424 A * | 6/1964 | Peppler | ........... | B65B 43/44 221/222 |
| 3,190,466 A * | 6/1965 | Hostetier | ........... | B65G 59/063 414/788.8 |
| 3,869,048 A * | 3/1975 | Takahashi | ........... | B65G 59/063 414/797.5 |
| 4,172,686 A * | 10/1979 | Shorthouse | ........... | B65G 59/026 198/719 |
| 4,538,293 A * | 8/1985 | Cutter | ........... | G03B 42/025 378/181 |
| 4,701,092 A * | 10/1987 | Reynaud | ........... | B65G 59/063 221/251 |
| 4,702,660 A * | 10/1987 | Niehaus | ........... | B65G 59/063 221/297 |
| 4,865,515 A * | 9/1989 | Domer | ........... | B65G 57/302 414/788.2 |
| 5,632,590 A * | 5/1997 | Pearson | ........... | B25J 17/0208 414/404 |
| 6,139,254 A * | 10/2000 | Ouellette | ........... | B65G 59/063 198/345.1 |
| 6,658,816 B1 * | 12/2003 | Parker | ........... | B65G 57/005 414/2 |
| 6,932,557 B2 * | 8/2005 | Downs | ........... | B25J 15/0253 294/104 |
| 7,381,026 B1 * | 6/2008 | Power | ........... | B65G 59/10 414/795.6 |
| 7,913,975 B2 * | 3/2011 | Haynes | ........... | B65G 57/165 254/133 R |
| 7,967,543 B2 * | 6/2011 | Criswell | ........... | B65G 47/905 414/373 |
| 9,555,981 B2 * | 1/2017 | Burgel | ........... | B65G 59/067 |
| 9,785,911 B2 * | 10/2017 | Galluzzo | ........... | B25J 5/007 |
| 10,138,079 B2 * | 11/2018 | Murarotto | ........... | B65G 57/24 |

(Continued)

*Primary Examiner* — Lynn E Schwenning
(74) *Attorney, Agent, or Firm* — BakerHostetler (57) ABSTRACT

An end-of-arm tool lifts a stack of totes and ejects a lowermost tote one at a time. The tool includes fixed unloading arms on which an outgoing tote slides in response to a pusher. A pair of staging arms lift the totes above the outgoing tote to free the outgoing tote and enable the outgoing tote to slide on the unloading arms.

20 Claims, 7 Drawing Sheets

(56) References Cited

U.S. PATENT DOCUMENTS

| | | | |
|---|---|---|---|
| 2003/0005666 A1* | 1/2003 | Grams | B25J 15/0475 |
| | | | 53/473 |
| 2003/0120387 A1* | 6/2003 | Sherwin | B25J 15/0052 |
| | | | 700/245 |
| 2004/0179924 A1* | 9/2004 | Lundahl | B65G 59/02 |
| | | | 414/416.01 |
| 2005/0220600 A1* | 10/2005 | Baker | B65G 1/04 |
| | | | 414/626 |
| 2010/0140969 A1* | 6/2010 | Lin | B25J 15/0052 |
| | | | 294/86.4 |
| 2013/0187398 A1* | 7/2013 | Cho | B65G 47/90 |
| | | | 294/61 |
| 2015/0203304 A1* | 7/2015 | Morency | B65G 61/00 |
| | | | 414/797 |
| 2015/0336753 A1* | 11/2015 | Lykkegaard | B64F 1/368 |
| | | | 414/788.2 |
| 2017/0233199 A1* | 8/2017 | King | B65G 57/30 |
| | | | 414/789.7 |

* cited by examiner

Fig.8

END OF ARM TOOL CAPABLE OF EJECTING TOTES

BACKGROUND

This invention is related to container transport, and more particularly to robotic tools and methods for picking up and unloading containers, such as totes.

A great number of containers are moved in modern commerce. For example, in a modern fulfillment center, items are placed into open-top containers referred to as totes for movement within a fulfillment center.

Often, totes or like containers are stacked on a pallet for transport to another facility. Removing the stacked totes is sometimes referred to as destacking. Often, destacking is performed by a person, who places the totes on a conveyor or on a shelving unit sometimes referred to as a pod or tree. When stacked, many tote configurations are such that a tote partially nests in the tote below it. In the intermodal containers of commercial carriers, the number of totes that can be stacked can be limited to either four or five in some circumstances.

DETAILED DESCRIPTION OF ILLUSTRATIVE EMBODIMENTS

Figure 8:
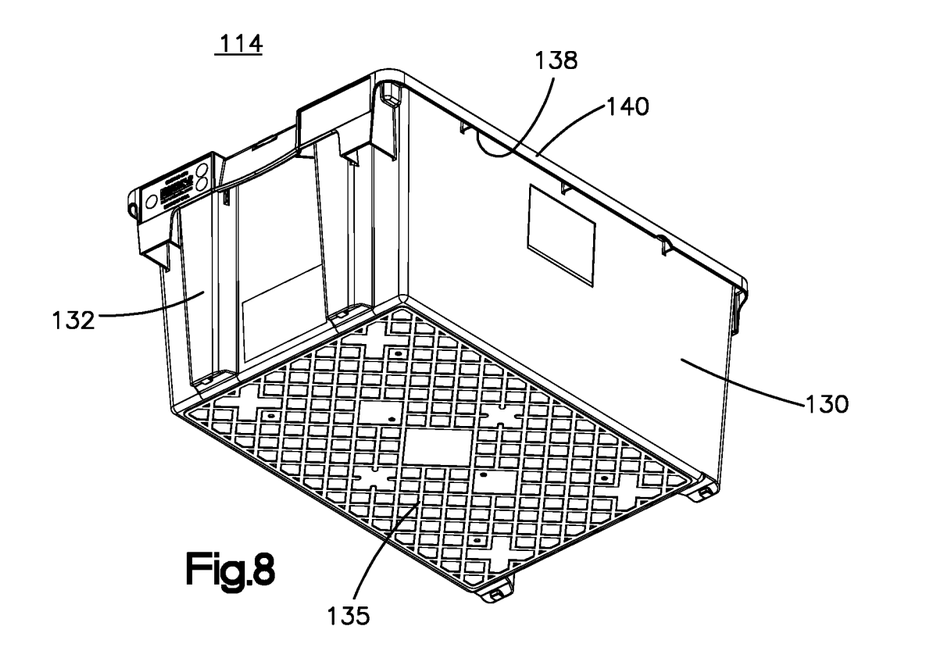
FIG. 8 is a perspective view of the underside of the tote of FIG. 7.

An end-of-arm tool (EOAT) is configured to engage a stack of totes, lift and transport the stack to a desired location, and then eject the totes to a desired location, such as a shelf unit or rack. In the embodiment of the figures, the EOAT includes a frame and a mount for attaching to an automated arm, such as a six-axis robot illustrated in FIG. 8. The automated arm can be any robot or gantry, or any mechatronic or mechanical structure or other structure. A pair of unloading arms extending from the bottom of the frame hold the load of all the totes in the stack. Optionally, a retainer near the top of the stack, under some circumstances, steadies the stack resting on the unloading arms. In this regard, the retainer may contact the tote to clamp the stack by applying a downward force or may be spaced apart from the tote such that the retainer limits movement of the totes from a desired arrangement. The term "steady" when applied to the function of the retainer broadly encompasses applying a force to the stack of totes (such as by clamping), applying a light contact with minimal force, and applying no force (that is, the retainers are spaced apart from the stack if and while the stack is in a desired vertical configuration) but such that the retainers provide bounds that limit undesired movement of the tote during operation.

Typically, a tote in a stack partially rests below the plane of the upper rim of the tote on which it rests, which configuration is referred to herein as "nesting." Accordingly, in some configurations of totes, each tote in the stack inhibits the horizontal or outward movement of other totes in the stack.

A staging assembly lifts the totes in the stack vertically and off the tote that is in position to be unloaded, which is referred to as the outgoing tote. In the embodiment of the figures, the outgoing tote is the lowermost tote. After the totes are lifted from the lowermost tote, a pusher horizontally pushes the outgoing tote, which causes the outgoing tote to slide on an upper edge of the unloading arms. The figures illustrate a linear actuator for pushing the totes, and other structures are contemplated. For non-limiting examples, a scissor-lift-type linkages (or other folding or rotary actuator (such as motor and gearbox and like In some cases, the unloading arms include retractable teeth protruding upwardly from or above the upper edge of the unloading arms to reside in an underside recess in the lip of the tote to aid in retention of the tote on the unloading arms. The teeth have a pin that resides in an angled slot in a sliding retraction plate. With the teeth in the extended and retaining position, an actuator translates the retraction plate, which causes the slot to move such that the pin moves down to retract the teeth, which frees the outgoing tote to slide horizontally on the edges of the unloading arms. Other configurations of engagement between the tote and tool are contemplated in which a tote lip, recess, teeth, and the like are not required.

After the outgoing tote has been ejected, a vertical actuator lowers the totes remaining on the tool. Upon the totes resting on the unloading arms, and in this way putting a new tote in the outgoing tote position, an actuator moves the staging arms laterally outwardly relative to the outgoing tote, which enables the staging arms to clear the flanges of the outgoing tote to enable the ejection process to continue.

In the embodiment of the figures, the mechanism for outwardly moving the staging arms includes a crank mechanism that is connected to the arms via connecting rods. Rotation of the crank via a rotary actuator in one direction transmits force via connecting rods to the staging arms, which slide relative to the frame to move the staging arms relatively outward. Reversing the direction of the crank moves the arm inwardly to engage the second lowest tote in the stack to prepare the stack to be lifted from the outgoing tote.

Referring to the figures, a robot 6 is illustrated to position the end-of-arm tool 10 as desired and as explained below. Aspects of the tool are described to illustrate the structure and function of the particular embodiment shown, as it is not intended that the description of the embodiment shown should be limiting.

Tool 10 includes a structural frame 12 to which the components of tool 10 are affixed or carried. A face plate mount 14 is affixed to frame 12 for attaching to the distal end of robot 6. The mount can be any configuration to enable to tool 10 to be coupled to the arm 8 of the robot or like automated structure. A tool changer (not shown) may be employed at mount 14. In embodiments in which the tool changer is employed, tool 10 is still considered to be coupled to robot 6.

Figure 7:
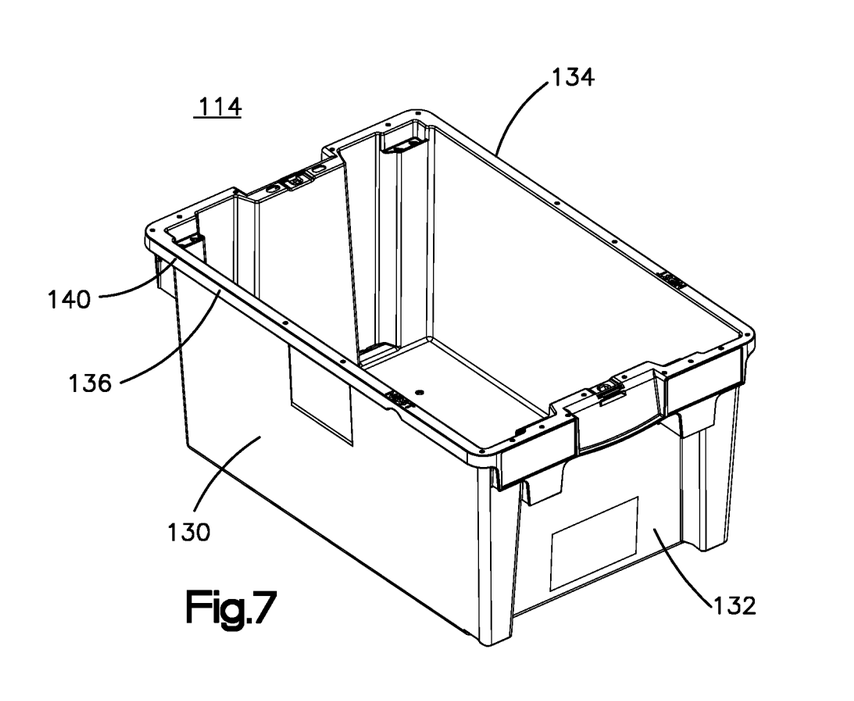
FIG. 7 is a perspective view of a tote of the general type that may be employed to house items and arranged in a stack that can be handled by the EOAT of FIG. 1.

Tool 10 is configured to carry totes. The term "tote" as used herein refers to containers that can house items, and which are stackable one on top of another. For example, as illustrated best in FIG. 7, each tote 114 preferably is an integral, high-impact plastic unit that includes a pair of tote sidewalls 130 and tote endwalls 132 having a common enclosed bottom 135 to form an open-top container. A flange 134 wraps around the periphery of the upper edge of each sidewall 130 and end wall 132. A lip 136 extends downwardly from the flange 134 such that a recess 138 is formed between an inboard surface of lip 136, outboard surfaces of walls 130 and 132, and a lower surface of flange 134. Preferably, gussets 140 span recess 138 to reinforce the flange and lip.

An unloading assembly 20 includes left and right unloading arms 22 projecting forward and horizontally from opposing sides of a lower portion of frame 14. A left arm can be parallel to the right arm. An upper lip or edge 24 of the arms 22 form a sliding surface on which the totes can be translated during the ejection or unloading process. The term "horizontal" and "vertical" are used herein with general reference to orientation relative to frame 12. The terms refer to approximate orientations, as a person familiar with tools for transporting totes will understand that a moderate magnitude of tilting and angling relative to perfect horizontal and vertical is encompassed in the terms when understood in view of the description herein.

Teeth 80 project upwardly from inboard portions of arms 22. Teeth 80 are positioned and configured to protrude into recesses 138 in order to inhibit tote 114 from sliding or unloading arm surface 24. Teeth 80 are slideable relative to the corresponding arm 22, as each tooth is in a vertical channel formed by channel sidewalls 82. Each tooth 80 includes a pin 84 protruding in an outboard orientation from a lower portion of the body of the tooth 80.

Figure 2:
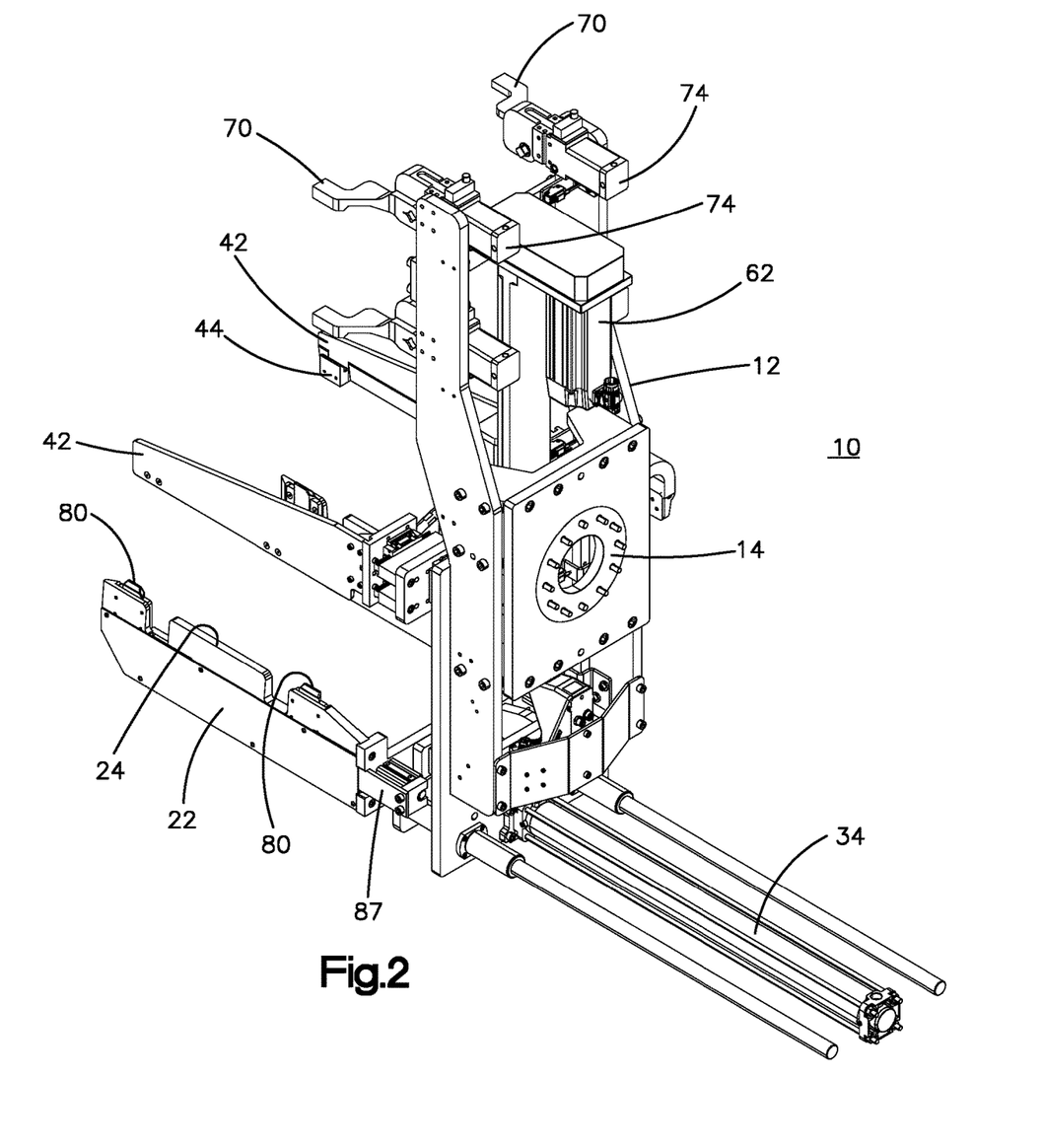
FIG. 2 is rear perspective view of the EOAT of FIG. 1.
Figure 3:
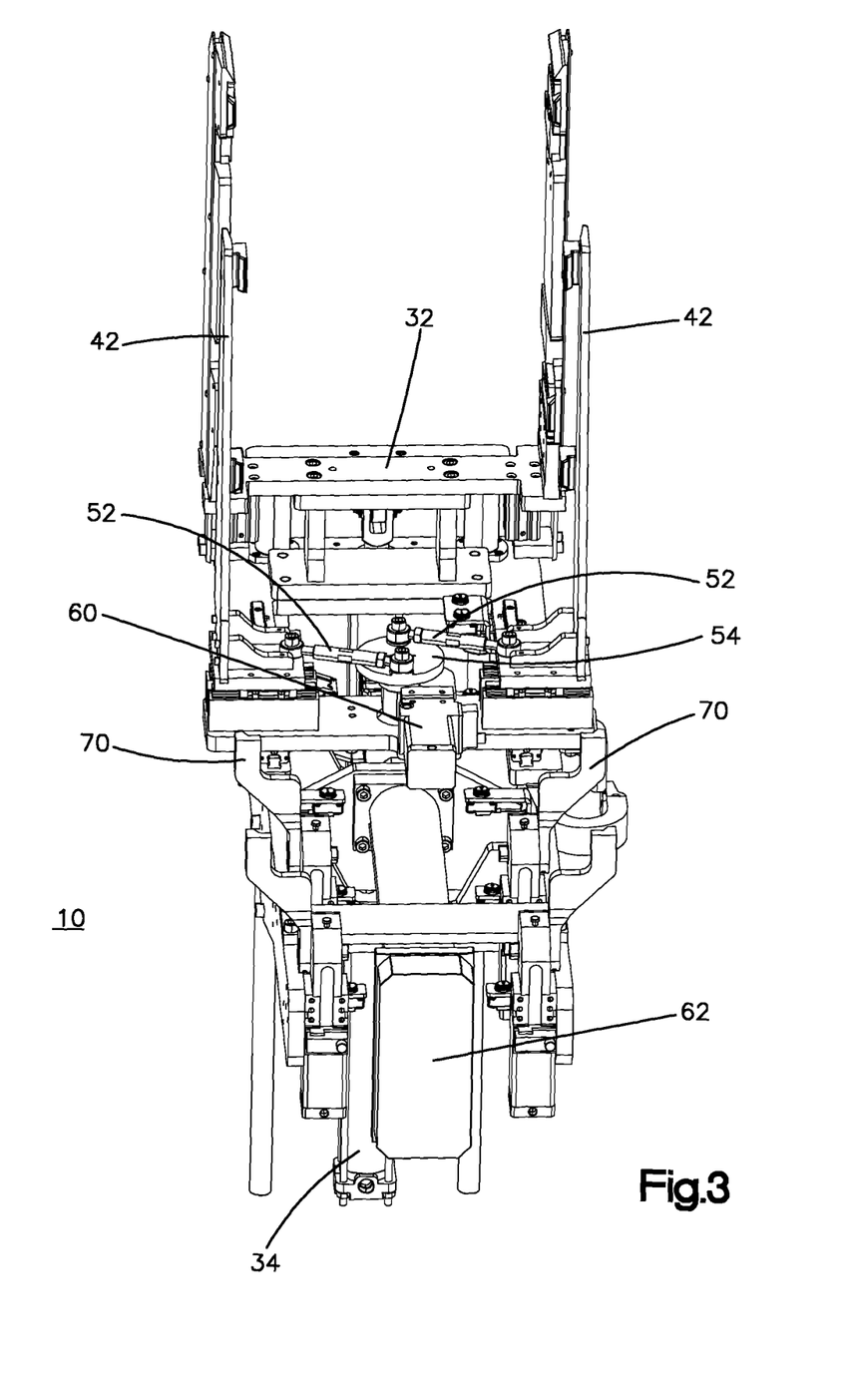
FIG. 3 a bottom perspective view of the EOAT of FIG. 1.
Figure 4:
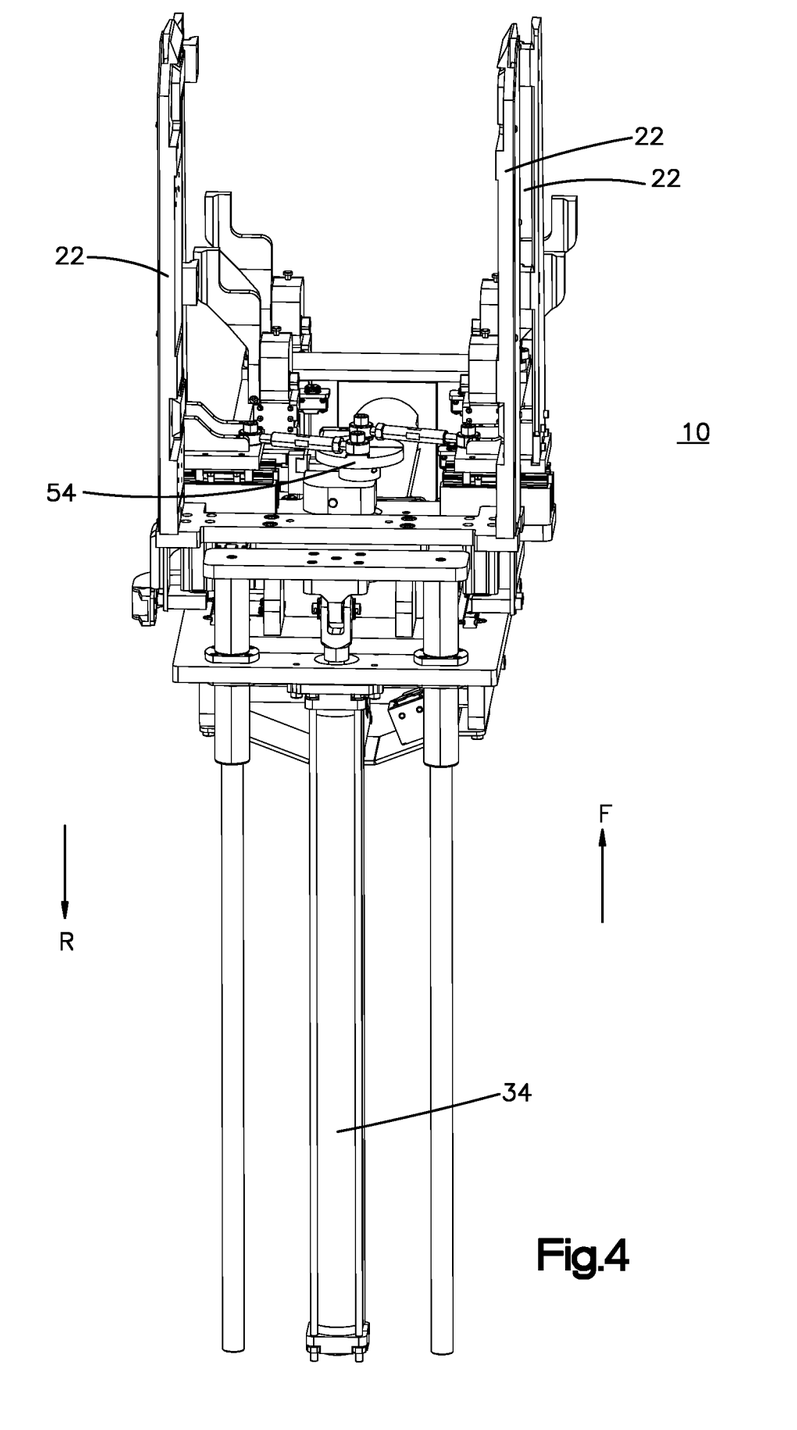
FIG. 4 is a top perspective view of the EOAT of FIG. 1.
Figure 5:
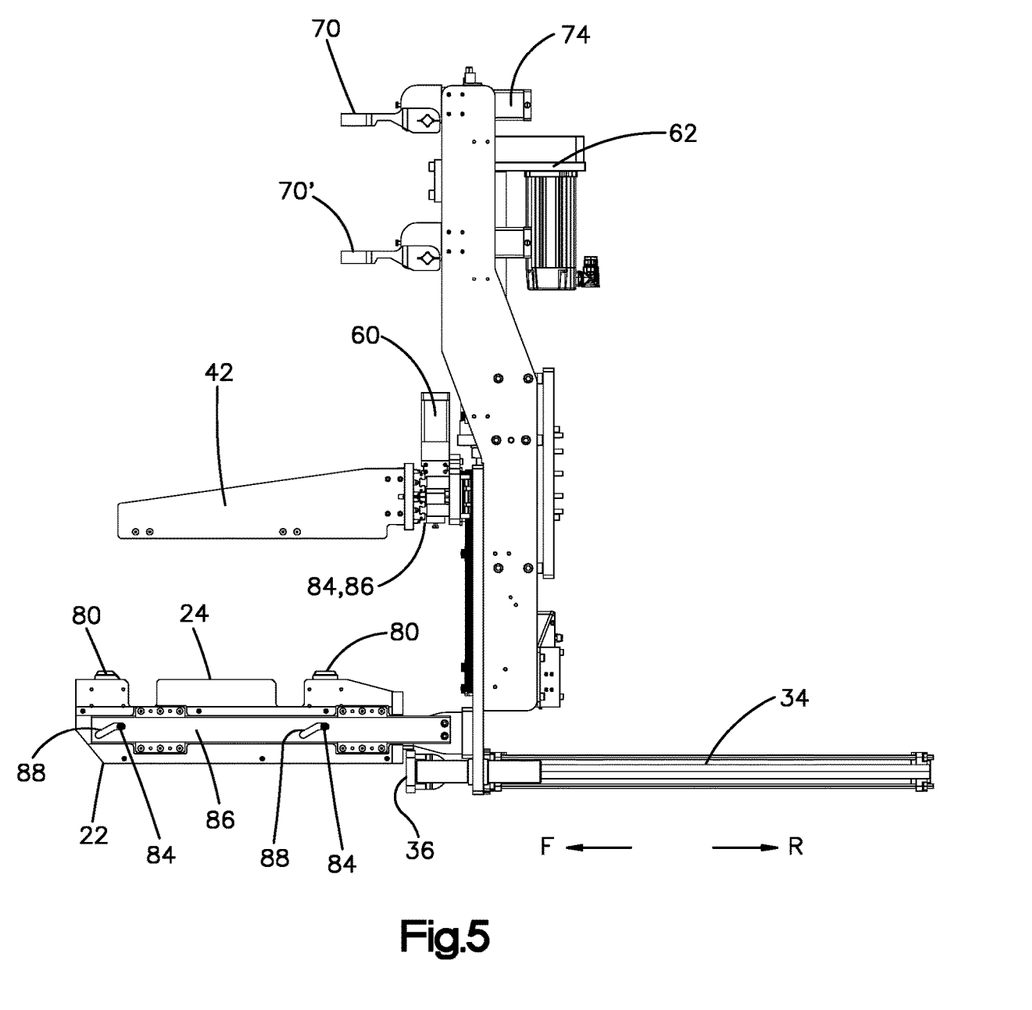
FIG. 5 is a side view of the EOAT of FIG. 1, with a side cover of the unloading arm removed for clarity.
Figure 6:
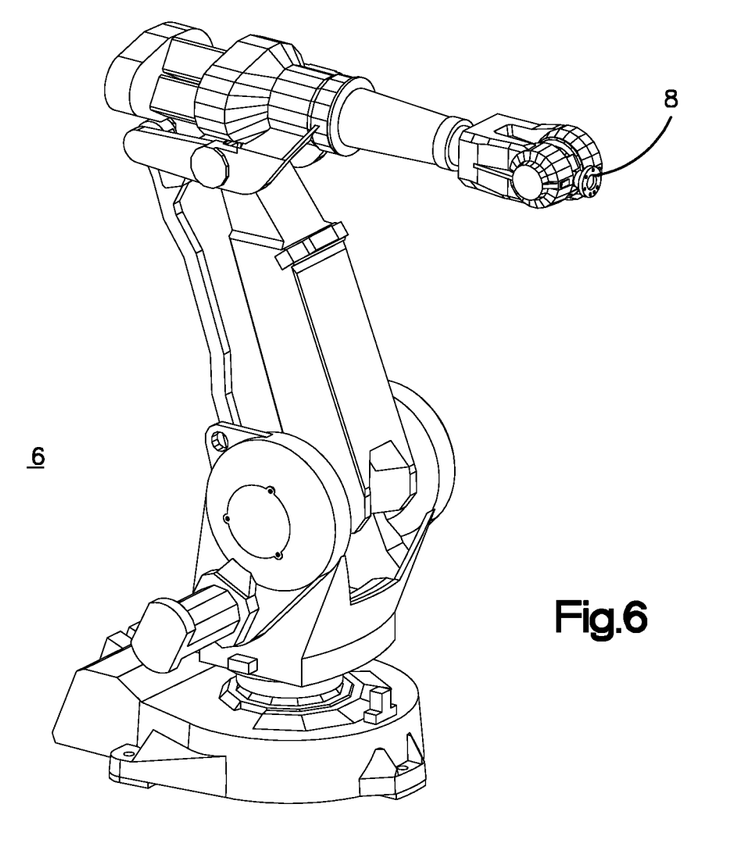
FIG. 6 is a robot of a type that may be used to move the EOAT of FIG. 1.

A slideable actuator plate 86 is mounted on each arm 22. FIG. 5 illustrates an actuator plate 86, as an outboard sidewall of the arm 22 is removed for clarity. Plate 86 includes a pair on slotted holes 88 in which pin 84 protrudes. A plate actuator 87 (FIG. 2) translates plate 86 forward and rearward such that pin 84 moves up and down in angled slot 88, as tooth 80 is restrained from forward and rearward movement by channel walls 82 affixed to arms 22. In this way, the teeth 80 may be retracted to a position below edge 24 and out of engagement with the tote, and then extended to a raised position in which the teeth extend higher than the position of edge 24 to protrude into tote edge recess 138.

A pusher assembly includes a pusher 30 that is at or near a lower portion of frame 12 and affixed thereto. Pusher 30 includes a pad 32 that protrudes forward and is positioned to contact endwall 132 of the tote during the ejection process. Pusher 30 also includes a linear actuator 34 that protrudes rearwardly from the frame. A shaft, such as a cylinder or screw, of actuator 34 extends forward and is mounted to pad 32 at the distal end of the shaft. Actuation of actuator 34 extends or retracts pad 32 relative to arms 22.

A staging assembly 40 is provided to lift totes vertically off of the tote that is engaged with the unloading arms 22 or in the process of being ejected. Staging assembly 40 includes a pair of staging arms 42 and a lateral movement mechanism 50. Staging arms 42 are left and right arms that protrude in a forward direction roughly from opposing sides of frame 12 and roughly (at some times) above unloading arms 22. Each staging arm 42 includes fingers 44 that project from inboard sides of the staging arms 42 to engage the bottom wall 135 of the tote immediately above the outgoing tote.

Lateral movement mechanism 50 can be of any type that is configured to move staging arms 42 into and out of side or underside engagement of the tote. In the embodiment of the figures, mechanism 50 includes a slider crank 52 that is connected to left and right connecting rods 54. Distal ends of the rods 54 are connected to arms 42. Preferably, the connections are conventional pivotable connections that are well known. Each arm 42 is slideable connected by horizontal rails 56 in corresponding grooves 58.

Figure 1:
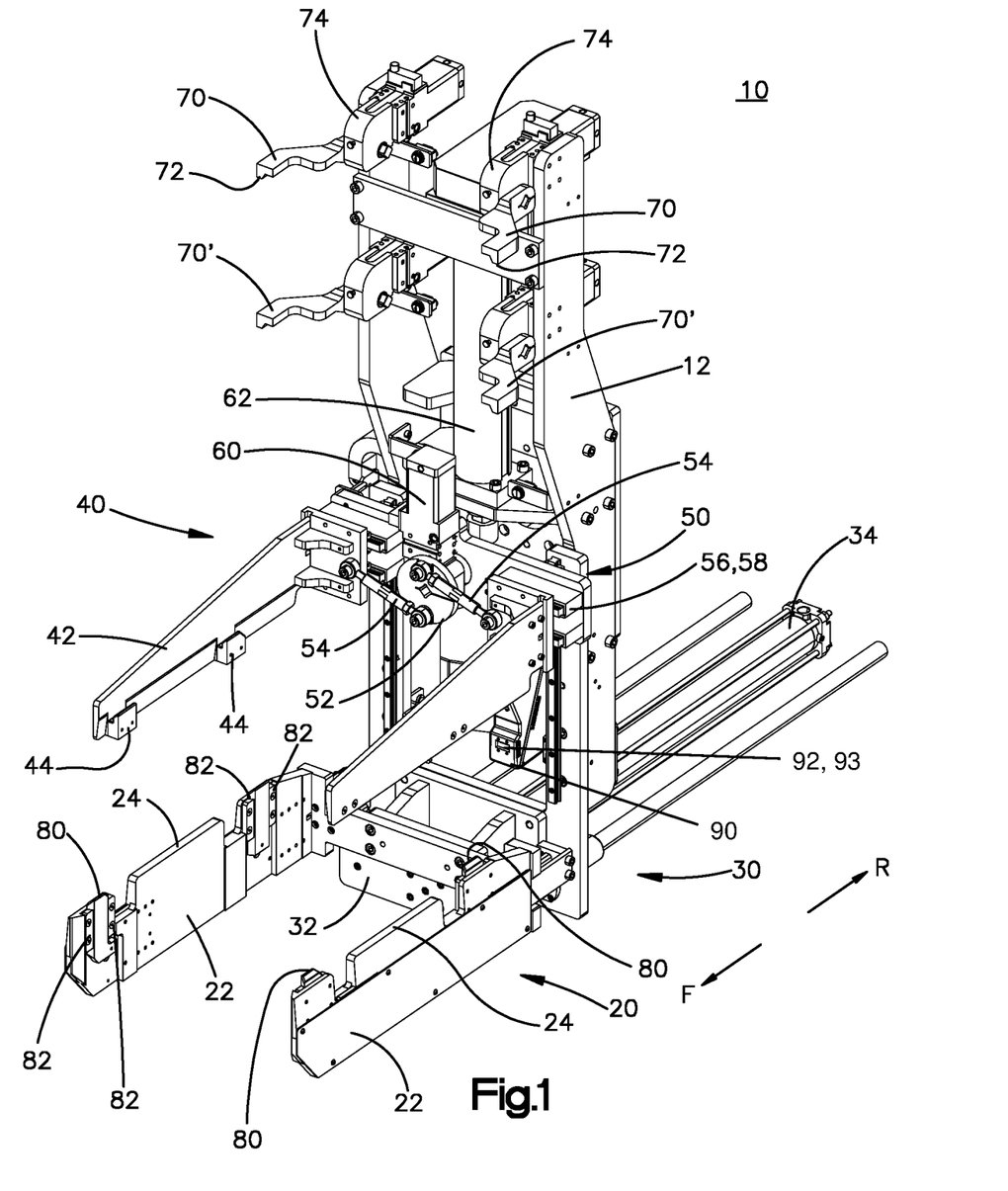
FIG. 1 a front perspective view of an example of an end-of-arm tool (EOAT) for lifting and transporting a stack of totes, and then ejecting the totes one at a time.

A rotary actuator 60 is connected to crank 52 such that rotation of the crank in one direction (clockwise in the orientation of FIG. 1) transmits an outwardly oriented force on the arms 42. In response to the force, arms 42 move mutually outwardly as rails 56 slide in grooves 58. Rotation of crank 52 in the opposing direction (counter-clockwise in the orientation of FIG. 1) retracts or pulls in arms 42 by reversing the forces applied and the sliding direction. Actuator 60 may be any type, such as a stepper motor, servo motor, or the like. Many configurations are contemplated, such as rails on the arms or rails on the frame, a pair of outwardly facing linear actuators, a four bar linkage, and any other structure capable of moving the arms mutually or relatively inwardly and outwardly.

The staging assembly 40 is also slideably mounted relative to frame 12 so as to move vertically. In this regard, a lift actuator 62 moves the staging arms 42 upwardly and then downwardly, as explained more fully below. Actuator 62 may be an electro-mechanical linear actuator, a pneumatic or hydraulic cylinder, or any other actuator. Actuator 62 may also be a motor and gearbox to drive arms 42 upwards and downwards, as any mechanism may be employed.

A pair of retainers 70 are mounted near an upper portion of frame 12 and are configured to pivot in a horizontal plane parallel to the forward and rearward directions (arrows F and R in the figures). Retainers 70 are pivotally mounted on a portion of frame 12 and are aligned at or near the corresponding corners of the uppermost tote 114 in the stack when the tool is loaded with a stack of totes. Each retainer 70 in the embodiment of the figures has a downwardly protruding lip 72 to bracket or engage the outermost portions of the flange 134 or lip 136 of the uppermost tote. In the figures, a second set of retainers 70' are located below retainers 70. Second or lower retainers 70' remain retracted while tool 10 is engaged with a four-tote stack. Lower retainers 70' however are engaged when tool 10 is unloading or de-stacking three tote stacks. As will be clear to a person familiar with end of arm tools, the tool can be configured to handle any number of containers or tote by modifying dimensions in a straightforward way. Accordingly, the present invention is not limited to a tool or process for any particular number of totes.

An actuator, such as a rotary actuator (such as a stepper motor or servo motor), is coupled to the pivot end of the retainer 70. Upon engagement, the downward force of the uppermost tote and the bracketing of the tote sides 134 or 136 by retainer lip 72 steadies the stack while the arm 8 moves the tool 10 (loaded with totes) from a loading location to an unloading location.

A vision system 90 may be located at a lower end of frame 12. Vision system 90 can assess the position of EOAT 10 relative to a stack of totes and in cooperation with a control system (not shown in the figures) to guide EOAT 10 into engagement with the stack of totes. Vision system 90 may be a laser profilometer, preferably of a conventional type, that acquires the image of lowermost tote 114. Other functions are possible, such as acquiring an image of the pallet or other structure. A reader 92, such as a bar code or 2D code reader or the like, is located in a position in which it reads identifying information on the tote. Reader 92 is located to aligned with the outgoing tote, and additional readers and locations of the reader are contemplated.

A sensor 93 (FIG. 1) may be employed to ascertain and signal the presence or absence of a tote. Sensor 93 may be a proximity sensor or other type. Other means for sensing the presence of a tote or other attributes of the system may be employed.

In operation, upon instructions from a control system, arm 8 moves tool 10 into position relative to a stack of totes 114. Vision system 90 determines the location of the lowermost tote in the stack (or, optionally, a tote that is not the lowermost of the stack but the lowest tote that the tool is intended to lift) and provides information to the control system for engaging the stack with tool 10. The angled or tapered sidewalls of the totes enable entry of arms 22 and 42 into a densely packed array of stacks.

Tool 10 is moved horizontally and, possibly, vertically such that the unloading arms 22 extend along sidewalls 130 of the lowermost tote and the edge 24 of the arms 22 engage the underside of the lip 136 of the tote. Teeth 80 may be extended during this engagement process or may be retracted and then extended via actuator plate 86 after the arms 22 are in position relative to tote sidewalls 130. Retainer actuators 74 rotate retainers 70 onto the flange 134 of the uppermost tote to steady and help retain the stack in position on tool 10, such as by keeping teeth 80 protruding into recess 138 of the lowermost tote.

Tool 10 is them moved by robot 6 such that outgoing (that is, lowermost) tote 114 is aligned with a desired unloading structure, such as a shelf unit, rack, conveyor, tote storage machine, or other structure. When the control system determines that tool 10 is in its desired position for ejecting the outgoing tote, retainers 70 are rotated upwardly out of engagement with the top of the uppermost tote, and staging arms 42 in their inboard position are moved upwardly by lift actuator 62 until fingers 44 engage a lower edge of the lip 136 of the tote above the outgoing tote (that is, the second to lower tote in the stack). Actuator 62 lifts the totes in the stack off of the outgoing tote, in this way providing top clearance above the outgoing tote to free the outgoing tote to slide forward.

In this regard, teeth 80 are also moved from the extended position to the retracted position, in this way providing bottom clearance to the outgoing tote for sliding on arm surface 24. Pusher actuator 34 pushes pad 32 forward into contact with proximal endwall 132. In response, the outgoing tote slides forward on edges 24 until it is ejected from the tool and rests on the desired shelf or rack. After ejection of the tote from tool 10, actuator 34 retracts pad 32 to clear space for another tote from the stack to be lowered into place.

Lift actuator 62 then lowers the stack of totes until the next tote rests on unloading arms 22, and thus becomes the outgoing tote. Cutouts in unloading arms 22 enable fingers 44 of the staging arms 42 to recess into arm 24, which enables staging arm 42 to lower the tote into contact with edge 24 of unloading arms 22. Lateral movement mechanism 50 moves staging arms 42 out of engagement with the outgoing tote by rotary movement of crank 54. Staging arms 42 are moved upwardly by lift actuator 62 into position on the second-to-lowermost tote. Fingers 44 engage lip recess 138 to lift the remaining totes in the stack such that when tool 10 is in position to eject the new outgoing tote, staging arms 42 lift the tote to repeat the ejection process described above. This process is repeated until all the totes on tool 10 are unloaded from the tool to their desired locations. Arm 8 then positions tool 10 relative to another stack of totes and the destacking and ejection processes continue.

Some, any, or all of the methods and operations described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

The various examples further can be implemented using one or more user computers, computing devices or processing devices. Such a system can include a number of workstations running any of a variety of commercially-available operating systems and other known applications for purposes such as development and database management. These devices also can include other electronic devices, such as dummy terminals, thin-clients, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The robotic arm technology disclosed herein may be employed with machine learning algorithms or artificial intelligence that enhances the control of the fingers and associated structure and function. In this regard, a control system may interpolate from existing information about and experiences with successful and unsuccessful prior sequences of seeing, engaging, and lifting an object according to established principles for computer learning. Further, the inventors contemplate a control system may extrapolate from the information and experiences to establish new sequences and functions for the robotic arm.

In view of the above controls description, the present invention is not intended to be limited to any particular type of hardware or software or any particular control means, but rather is intended to be able to be employed using any suitable controller.

The present invention has been described by employing examples of structure and function of the tool and related structures. The present invention is not intended to be limited to the particular structure or function of the tool or related structures unless expressly stated in the claims. Rather, the invention encompasses the structure(s) and function(s) defined in the claims and understood by persons familiar with container handling to flow naturally from the present disclosure. For example, the structure of the arms, pusher, actuators, and the like can take any form and perform some, all, or none of the functions described above. Further, advantages of the structure and function have been described for context of the invention only. It is not intended that the present invention be limited to any advantage unless expressly stated in the claims.

What is claimed is:

1. A system for de-nesting totes that are in a nested configuration and for ejecting the totes from the system one at a time, the system comprising:
    an end-of-arm tool (EOAT) including:
        a frame including a mount;
        a pair of unloading arms affixed to the frame, the unloading arms adapted for vertically supporting an outgoing tote;
        a pusher adapted for pushing the outgoing tote off the unloading arms; and
        a staging assembly positioned above the unloading arms, the staging assembly including a pair of staging arms adapted for lateral movement into and out of engagement with a tote above the outgoing tote and for vertical movement to lift remaining totes above the outgoing tote off the outgoing tote to free the outgoing tote from the nested configuration and to subsequently lower the remaining nested stack of totes onto the unloading arms after the outgoing tote has been pushed off the unloading arms by the pusher; and
    an automated arm coupled to the mount of the EOAT and configured to position the EOAT relative to the totes.

2. The system of claim 1, wherein the staging assembly further includes an actuator adapted for moving the staging arms laterally into and out of engagement with the tote above the outgoing tote.

3. The system of claim 2, further comprising a vision system adapted for aligning the unloading arms with one of the totes.

4. The EOAT of claim 2, further comprising a retainer assembly adapted for engaging a topmost one of the totes.

5. The system of claim 1, wherein the pair of unloading arms are rigid.

6. An end-of-arm tool (EOAT) comprising:
    a frame including a mount for attaching the EOAT to an automated arm;
    a pair of unloading arms adapted for vertically supporting an outgoing tote;
    a pusher adapted for pushing the outgoing tote off the unloading arms; and
    a staging assembly positioned above the unloading arms, the staging assembly adapted for lateral movement into and out of engagement with a tote above the outgoing tote and for vertical movement to lift remaining totes above the outgoing tote out of nesting engagement with the outgoing tote when the outgoing tote is supported on the unloading arms and, after ejection of the outgoing tote by the pusher, to lower the remaining nested stack of totes onto the unloading arms.

7. The EOAT of claim 6, wherein the staging assembly further includes a pair of staging arms adapted for lifting the remaining nested stack of totes relative to the outgoing tote.

8. The EOAT of claim 7, wherein the staging assembly further includes an actuator adapted for moving the staging arms laterally into and out of engagement with the tote above the outgoing tote.

9. The EOAT of claim 8, wherein the actuator includes a slider crank including linkages coupled to the staging arms and a rail mechanism adapted to enable lateral sliding of the staging arms relative to the frame.

10. The EOAT of claim 6, wherein the unloading arms are fixed relative to the frame.

11. The EOAT of claim 6, further comprising a retainer assembly adapted for engaging a topmost tote.

12. The EOAT of claim 11, wherein the retainer assembly includes retainer actuators adapted for moving retainers into and out of engagement with the topmost tote.

13. The EOAT of claim 6, wherein the unloading arms include retractable teeth adapted for moving between an extended position for engaging the outgoing tote and a retracted position for freeing the outgoing tote.

14. The EOAT of claim 6, further comprising a vision system adapted for aligning the unloading arms with one of the totes.

15. A method of lifting and ejecting a tote of a nested stack of totes using the EOAT of claim 5, the method comprising:
    moving the EOAT to engage the nested stack of totes;
    positioning the nested stack of totes relative to a desired discharge location;
    lifting the remaining nested stack of totes vertically from the outgoing tote;
    pushing the outgoing tote off the unloading arms; and lowering the remaining nested stack of totes onto the unloading arms.

16. The method of claim 15, further comprising moving the staging arms laterally outward after lowering the remaining nested stack of totes.

17. The method of claim 16, wherein moving the staging arms laterally outward includes turning a slider crank to slide the staging arms relative to the frame.

18. The method of claim 15, further comprising retracting teeth of the unloading arms to free the outgoing tote and enable pushing of the outgoing tote off the unloading arms.

19. The method of claim 15, wherein moving the EOAT to engage the nested stack of totes includes moving the unloading arms horizontally and vertically upward into engagement with an underside lip of the outgoing tote.

20. The EOAT of claim 6, wherein the pair of unloading arms are rigid.

\* \* \* \* \*